United States Patent
Yang et al.

(10) Patent No.: US 10,644,845 B2
(45) Date of Patent: May 5, 2020

(54) METHOD AND APPARATUS FOR CROSS-LINK INTERFERENCE MEASUREMENTS IN MOBILE COMMUNICATIONS

(71) Applicant: MediaTek Inc., Hsinchu (TW)

(72) Inventors: Weidong Yang, San Diego, CA (US); Bo-Si Chen, Hsinchu (TW)

(73) Assignee: MEDIATEK INC., Hsin-chu (TW)

( * ) Notice: Subject to any disclaimer, the term of this patent is extended or adjusted under 35 U.S.C. 154(b) by 0 days.

(21) Appl. No.: 15/970,881

(22) Filed: May 4, 2018

(65) Prior Publication Data
US 2018/0323916 A1 Nov. 8, 2018

Related U.S. Application Data

(60) Provisional application No. 62/502,559, filed on May 5, 2017.

(51) Int. Cl.
*H04L 1/24* (2006.01)
*H04L 5/00* (2006.01)
(Continued)

(52) U.S. Cl.
CPC ............ *H04L 1/248* (2013.01); *H04J 11/005* (2013.01); *H04L 5/0053* (2013.01); *H04W 16/18* (2013.01);
(Continued)

(58) Field of Classification Search
CPC . H04W 72/044; H04W 16/14; H04W 72/082; H04W 24/10; H04L 5/0048; H04L 5/0053; H04L 5/0073; H04L 5/005
See application file for complete search history.

(56) References Cited

U.S. PATENT DOCUMENTS

| 2016/0105248 A1* | 4/2016 | Lunttila | H04B 17/345 370/252 |
| 2018/0248608 A1* | 8/2018 | Akoum | H04L 5/0048 |
| 2018/0287739 A1* | 10/2018 | Kim | H04B 1/525 |

FOREIGN PATENT DOCUMENTS

| CN | 101043708 A | 9/2007 |
| WO | WO 2016119761 A1 | 8/2016 |

(Continued)

OTHER PUBLICATIONS

Author Unknown, WF on cross link interference detection for duplexing flexibility, Doc. No. R1-1706301, Apr. 7, 2017, pp. 1-2 (Year: 2017).*

(Continued)

*Primary Examiner* — Christopher M Crutchfield
(74) *Attorney, Agent, or Firm* — Han IP PLLC; Andy M. Han

(57) ABSTRACT

Various solutions for cross-link interference measurements with respect to user equipment and network apparatus in mobile communications are described. A node of a wireless network may receive a cross-link interference (CLI) measurement configuration. The node may determine a measurement slot according to the CLI measurement configuration. The node may determine whether to perform a CLI measurement in the measurement slot according to the CLI measurement configuration. The node may receive a CLI reference signal (RS) in the measurement slot. The node may perform the CLI measurement in the measurement slot.

20 Claims, 6 Drawing Sheets

(51) Int. Cl.
    *H04J 11/00*     (2006.01)
    *H04W 24/10*     (2009.01)
    *H04W 52/02*     (2009.01)
    *H04W 16/18*     (2009.01)

(52) U.S. Cl.
    CPC ........... *H04L 5/0048* (2013.01); *H04W 24/10* (2013.01); *H04W 52/0203* (2013.01)

(56) References Cited

FOREIGN PATENT DOCUMENTS

| WO | WO 2018/126792 | * | 11/2017 |
|---|---|---|---|
| WO | WO 2018/128297 | * | 12/2017 |

OTHER PUBLICATIONS

Author Unknown, Discussions on channel and interference measurements for NR, Doc. No. R1-1707968, May 4, 2017, pp. 1-8 (Year: 2017).*
Translation of WIPO Publication No. 2017/110753 (Year: 2017).*
Translation of WIPO Publication No. 2018/128297 (Year: 2018).*
Translation of CN 201710014912 (Year: 2017).*
Translation of U.S. Appl. No. 62/443,813 (Year: 2017).*
State Intellectual Property Office, International Search Report and Written Opinion for International Application No. PCT/CN2018/085650, dated Jun. 27, 2018.
Huawei, et al., On CLI measurement and power control for cross-link interference mitigation, 3GPP TSG RAN WG1 Meeting #88bis, Spokane, U.S.A., Apr. 3-7, 2017.
ZTE, et al., Discussion on Measurements and RS Design for CLI Mitigation, 3GPP TSG RAN WG1 Meeting #88, Athens, Greece, Feb. 13-17, 2017.

* cited by examiner

METHOD AND APPARATUS FOR CROSS-LINK INTERFERENCE MEASUREMENTS IN MOBILE COMMUNICATIONS

CROSS REFERENCE TO RELATED PATENT APPLICATION(S)

The present disclosure is part of a non-provisional application claiming the priority benefit of U.S. Patent Application No. 62/502,559, filed on 5 May 2017, the content of which is incorporated by reference in its entirety.

TECHNICAL FIELD

The present disclosure is generally related to mobile communications and, more particularly, to cross-link interference measurements with respect to user equipment and network apparatus in mobile communications.

BACKGROUND

Unless otherwise indicated herein, approaches described in this section are not prior art to the claims listed below and are not admitted as prior art by inclusion in this section.

In wireless communication environment, the wireless signals transmitted or broadcasted by a node of a wireless network may cause interferences to neighbor nodes within neighbor areas. In order to prevent potential interferences, the plurality of nodes within neighbor areas may have to communicate and negotiate with each other to properly arrange radio resources and mitigate interference. Accordingly, proper interference management schemes among the plurality of nodes may be needed.

In New Radio (NR), dynamic time division duplex (TDD) and mini-slot transmission were introduced for more dynamic and flexible information exchange between nodes. Also, over-the-air (OTA) signaling was adopted for more efficient communications among transmit/receive point (TRPs). Other TRP interferences may be much more dynamic than in Long-Term Evolution (LTE). Both the user equipment (UE) and the TRP may suffer from more cross-link interferences.

For cross-link interference mitigation, the cross-link interference measurement may be needed. For example, UE-UE interference measurements or TRP-TRP interference measurements may become important and necessary.

Accordingly, it is important to properly manage and avoid cross-link interferences among the UEs and the TRPs. Therefore, in developing communication system, it is needed to provide proper cross-link interference measurement mechanisms for more real-time and efficient interference management among a plurality of nodes.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to cross-link interference measurements with respect to user equipment and network apparatus in mobile communications.

In one aspect, a method may involve a node of a wireless network receiving a cross-link interference (CLI) measurement configuration. The method may also involve the node determining a measurement slot according to the CLI measurement configuration. The method may further involve the node determining whether to perform a CLI measurement in the measurement slot according to the CLI measurement configuration. The method may further involve the node receiving a CLI reference signal (RS) in the measurement slot. The method may further involve the node performing the CLI measurement in the measurement slot.

In one aspect, an apparatus may comprise a transceiver capable of wirelessly communicating with a plurality of nodes of a wireless network. The apparatus may also comprise a processor communicatively coupled to the transceiver. The processor may be capable of receiving a cross-link interference (CLI) measurement configuration. The processor may also be capable of determining a measurement slot according to the CLI measurement configuration. The processor may further be capable of determining whether to perform a CLI measurement in the measurement slot according to the CLI measurement configuration. The processor may further be capable of receiving a CLI reference signal (RS) in the measurement slot. The processor may further be capable of performing the CLI measurement in the measurement slot.

It is noteworthy that, although description provided herein may be in the context of certain radio access technologies, networks and network topologies such as LTE, LTE-Advanced, LTE-Advanced Pro, 5th Generation (5G), NR, Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to cross-link interference measurements with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Under proposed schemes in accordance with the present disclosure, cross-link interference may occur among nodes in a wireless network. Each node in the wireless network may be a network apparatus (e.g., TRP) or a communication apparatus (e.g., UE), and a UE may be engaged in communication with a TRP, another UE, or both, at a given time. Thus, the cross-link interference measurements may associate three types of node pairs: TRP-TRP, TRP-UE and UE-UE. Herein, a TRP may be an eNB in an LTE-based network or a gNB in a 5G/NR network.

Figure 1:
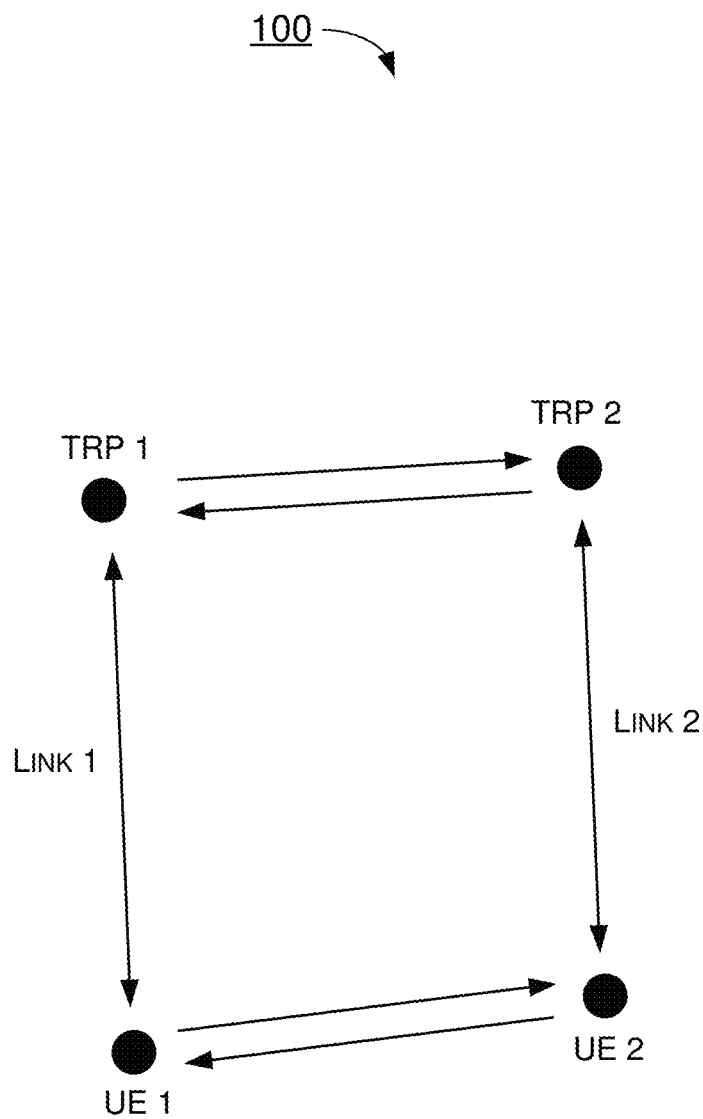
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a plurality of nodes including TRP 1, UE 1, TRP 2 and UE 2, which may be a part of a wireless communication network (e.g., an LTE network, an LTE-Advanced network, an LTE-Advanced Pro network, a 5G network, an NR network or an IoT network). The plurality of nodes may be capable of wirelessly communicating with each other via wireless signals. TRP1 and TRP may also be capable of communicating with each other via backhaul connections. FIG. 1 illustrates two data links including link 1 and link 2. Link 1 may be established between TRP 1 and UE 1 for data transmission between TRP 1 and UE 1. Link 2 may be established between TRP 2 and UE 2 for data transmission between TRP 2 and UE 2. However, the cross-link interference (CLI) may occur between the link 1 and the link 2. The transmission of link 1 may cause interferences to the transmission of link 2 and vice versa. For example, the signals transmitted from TRP 1 may become interference signals to TRP 2 or UE 2. The signals transmitted from UE 1 may also become interference signals to TRP 2 or UE 2. Accordingly, CLI measurements may be needed for mitigate the cross-link interferences.

For performing the CLI measurement, some reference signals may be needed for measurements by a node. In accordance with implementations of the present disclosure, a channel state information-reference signal (CSI-RS) may be used for TRP-TRP interference measurements and a sounding reference signal (SRS) may be used for UE-UE interference measurements. The signal used for the CLI measurement may be classified as the CLI reference signal (RS). In other words, the CLI RS may comprise the CSI-RS or the SRS. In some implementations, the CSI-RS or the SRS may also be used for TRP-UE interference measurements.

In order to improve the accuracy of the CLI measurement, a measurement slot may be determined to perform the CLI measurement. In the measurement slot, a node may be configured to send or measure the CLI RS. The occurrence of the measurement slot may be periodic. Periodic measurement slots may reduce information exchange among nodes and keep the CLI measurement procedure simple. In some implementations, the CLI RS locations within a slot may stay the same for all the measurement slots. Then the information needed to be exchanged among nodes may simply be the period and offset of the measurement slots.

In accordance with implementations of the present disclosure, a deterministic method may be used to determine what nodes to transmit the CLI RS or what nodes to measure the CLI RS. Specifically, a node may be configured to receive a CLI measurement configuration. The CLI measurement configuration may comprise at least one of a node identity (ID), a time-frequency location, a slot number or a symbol number of the CLI RS. The node may be configured to determine a measurement slot according to the CLI measurement configuration. The CLI measurement configuration may indicate periodic measurement slots.

After receiving the CLI measurement configuration, the node may be able to determine whether to perform the CLI measurement according to the CLI measurement configuration. In a case that the CLI measurement configuration indicates the node to measure the CLI RS, the node may be configured to receive the CLI RS in the measurement slots. The node may be further configured to perform the CLI measurement in the measurement slots.

Alternatively, after receiving the CLI measurement configuration, the node may be able to determine whether to transmit the CLI RS according to the CLI measurement configuration. In a case that the CLI measurement configuration indicates the node to transmit the CLI RS, the node may be configured to transmit the CLI RS in the measurement slots.

Figure 2:
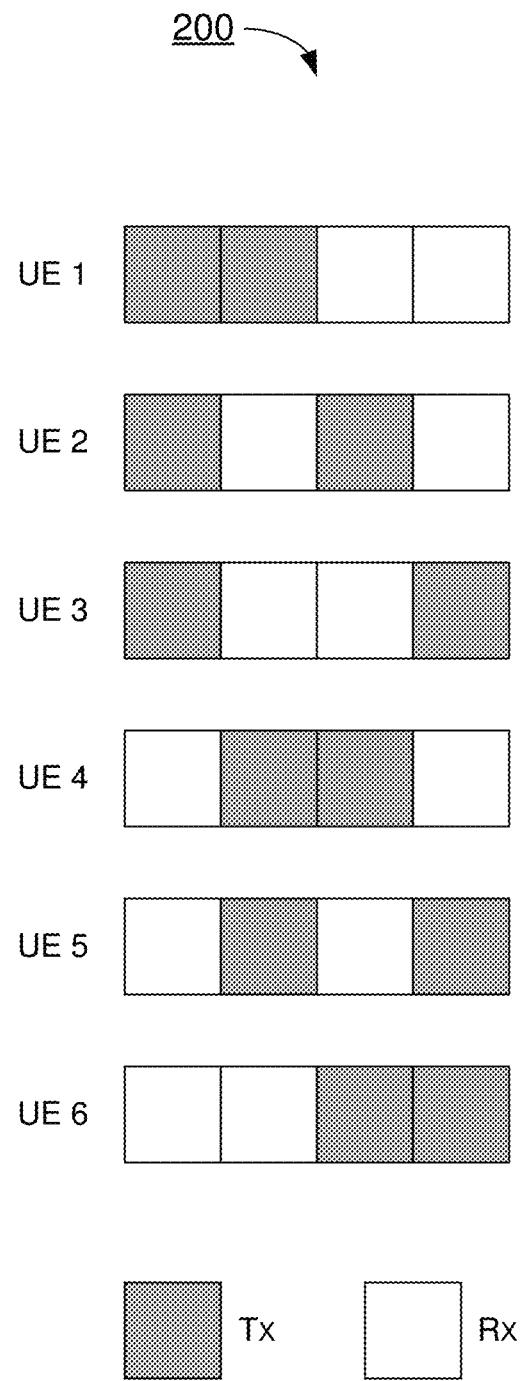
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a plurality of UEs including UE 1 to UE 6 and a plurality of TRPs, which may be a part of a wireless communication network (e.g., an LTE network, an LTE-Advanced network, an LTE-Advanced Pro network, a 5G network, an NR network or an IoT network). For UE-UE interference measurements, each UE may receive the CLI measurement configuration to determine whether to transmit the CLI RS (e.g., SRS) or measure CLI RS (e.g., SRS) in each time interval (e.g. slot). For example, in the first time interval, UE 1, UE 2 and UE 3 may be configured to transmit the CLI RS and UE 4, UE 5 and UE 6 may be configured to receive the CLI RS. In the second time interval, UE 1, UE 4 and UE 5 may be configured to transmit the CLI RS and UE 2, UE 3 and UE 6 may be configured to receive the CLI RS. In the third time interval, UE 2, UE 4 and UE 6 may be configured to transmit the CLI RS and UE 1, UE 3 and UE 5 may be configured to receive the CLI RS. In the fourth time interval, UE 3, UE 5 and UE 6 may be configured to transmit the CLI RS and UE 1, UE 2 and UE 4 may be configured to receive the CLI RS.

With proper configuration, each UE may have at least one opportunity to hear other UEs, and preferably each UE hears another UE for at least once. For example, UE 1 may receive the CLI RS from UE 2, UE 4 and UE 6 in the third time interval. UE 1 may also have opportunity to receive the CLI RS from UE 3, UE 5 and UE 6 in the fourth time interval. Then UE 1 may be able to measure the CLI RS from UE 2 to UE 6. Similarly, each UE may also have opportunities to measure the CLI RS from all other UEs.

In some implementation, a node may be configured to determine whether to transmit the CLI RS based on a probability p. The node may determine whether to transmit the CLI RS according to a traffic buffer status. A TRP may estimate the required downlink to uplink slot ratio based on the traffic buffer status and the estimated throughput of different transmission directions. The TRP may assign a probability p that equals to the required uplink slot ratio. P may be the probability to transmit the CLI RS on the CLI measurement slots. The node may transmit the CLI RS according to the probability p.

In some implementation, a demodulation reference signal (DMRS) may also be used to measure the CLI. The downlink DMRS and the uplink DMRS may be configured to have different sequences/designs and/or different frequency-time patterns. A receiver may measure the interference strength from different transmission directions based on the different sequences/designs and/or different frequency-time patterns.

In some implementation, co-design of the SRS and the CSI-RS may also be considered. The same resource pool may be used by the SRS and the CSI-RS. When a UE receives the CSI-RS, it may also have the ability to measure the SRS from other nodes. The reported CSI may then automatically take CLI into consideration. On the other hand, when a TRP receives the SRS, the CSI-RS from other nodes may also be measured by the TRP.

For long-term based UE-UE interference measurement, the TRPs may exchange the information with each other and have consensus on the measurement slots occurrences. The TRPs may also exchange the information about the SRS resources they used. The TRP may determine whether to transmit or measure the SRS in the measurement slots for the UEs under its control. In a case that the TRP determine to instruct its UEs to transmit the SRS in the measurement slots, it may trigger the UEs to transmit the SRS according to radio resource control (RRC) configured SRS resources or dynamically downlink control information (DCI) indicated SRS resources. In a case that the TRP determine to instruct its UEs to measure the SRS in the measurement slots, it may inform the UEs about the information of the SRS from other nodes. After measuring the CLI, the UE may be configured to feedback the measurement report to its serving TRP. The TRP may change its scheduling strategy based on the measurement report. The TPR may also forward the measurement report to the neighboring TRPs to achieve better system performance.

With measurement report exchanged among TRPs, coordinate scheduling may be possible to achieve a better system throughput. However, this implies that the UE should have ability to identify the SRS sources. Based on whether the SRS is resources specified, the UE may have different ways to identify the signals from different SRS sources (e.g., UEs under other TRPs). Specifically, in a case that the SRS is not resource specified, the UE may be configured to receive the SRS resources from the TRP. The SRS resources may comprise at least one of a root sequence, a cyclic shift, a comb number or a frequency location of the SRS transmitted from other nodes (e.g., other UEs under TRPs). This also implies that the TRPs may exchange the SRS resources information with each other. The UE may be configured to determine the SRS sequences according to the SRS resources. The UE may be configured to measure the reference symbol received power (RSRP) of each SRS. The UE may further be configured to report the SRS sequences and the RSRPs to its serving TRP.

Alternatively, in a case that the SRS is resource specified, the UE may be configured to blindly detect the possible SRS according to the pre-determined SRS resources without additional information from the TRP. The pre-determined SRS resources may comprise at least one of a root sequence, a cyclic shift, a comb number or a frequency location of the SRS transmitted from other nodes (e.g., other UEs under TRPs). The UE may determine the SRS sequences according to the pre-determined SRS resources. The UE may be configured to measure the RSRP of the possible SRS. The UE may further be configured to report the SRS sequences and the RSRPs to its serving TRP.

The measurement report may comprise the SRS sequences and the corresponding RSRPs. The reported RSRPs may exceed a pre-determined threshold value. The measurement report may comprise the strongest nth SRS sequences and the corresponding RSRPs. The serving TRP may forward the measurement report to the neighboring TRPs via backhaul or over the air (OTA) signaling. The neighboring TRP may then know which UE may cause strong CLI according to the sequences and the RSRPs. The neighboring TRP may schedule its UE on the resources that can avoid the CLI from other nodes. Besides, in a case that the TRPs may exchange information of the SRS resources to restrict the possible combinations, it may be helpful to reduce the number of blind detections on the UEs.

In some implementations, the UE may not need to identify the SRS sources or perform any blind detections. The UE may only report the received power on the given resources (e.g. REs occupied by SRSs). The UE may be configured to measure the received power over SRS resource(s) (e.g. REs occupied by SRSs) which is reported with an accompanying identification of the SRS resource(s) and/or SRS sequence(s) to its serving TRP. The serving TRP may only know whether the UE is severely interfered by other nodes or not (e.g., whether the UE is at the cell edge or not). The TRP may schedule the cell edge UE in the static slots where no CLI exists and schedule the cell center UE in the dynamic slots.

Figure 3:
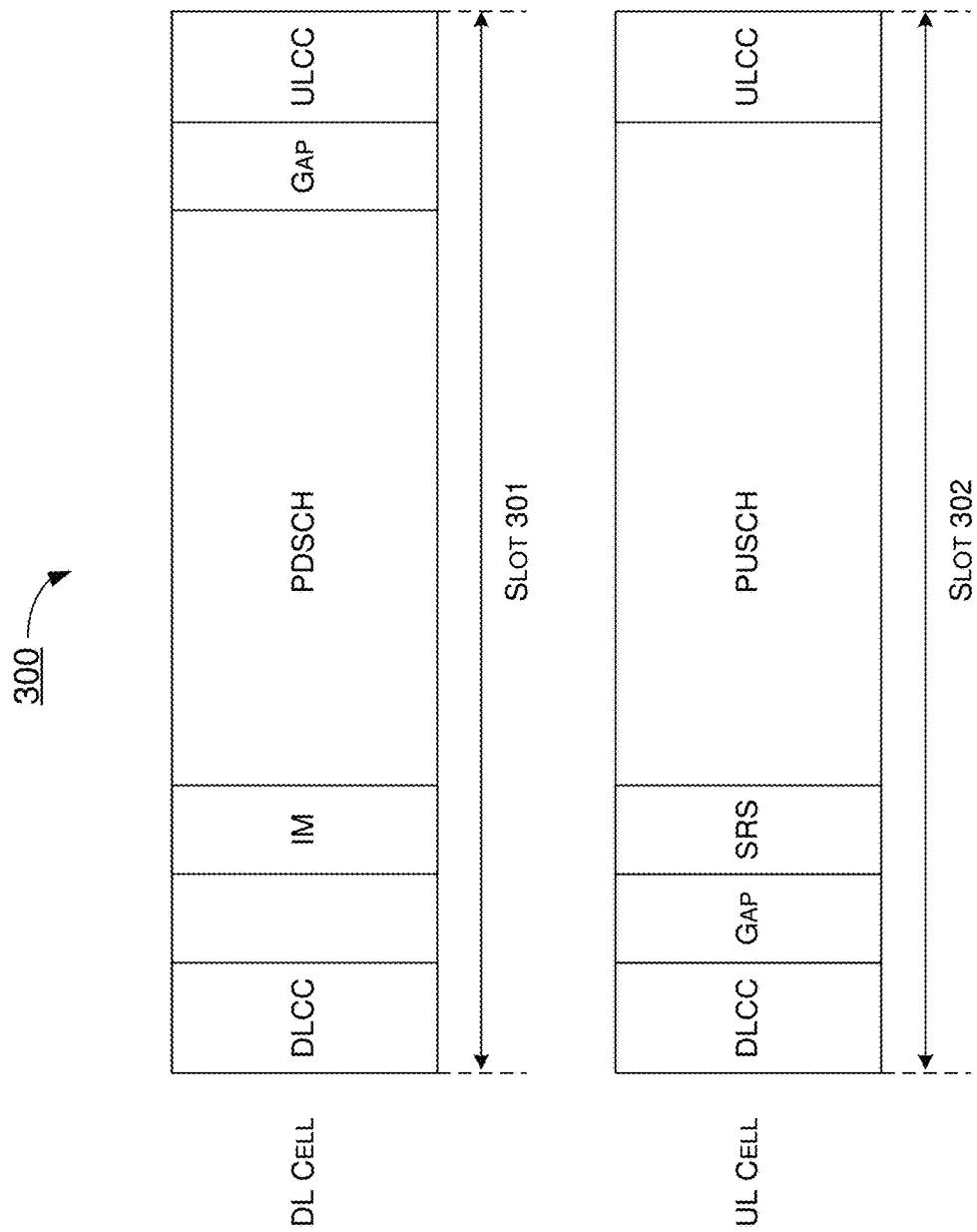
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a plurality of nodes including a downlink (DL) cell, a DL UE, an uplink (UL) cell and a UL UE, which may be a part of a wireless communication network (e.g., an LTE network, an LTE-Advanced network, an LTE-Advanced Pro network, a 5G network, an NR network or an IoT network). FIG. 3 illustrates slot 301 for a DL cell and slot 302 for an UL cell. Slot 301 may comprise a DL control channel (DLCC) region, an interference measurement (IM) region, a DL data region (e.g., physical downlink shared channel (PDSCH)), a transmit/receive (Tx/Rx) transition gap and an UL control channel (ULCC) region. The DLCC region may be used for the DL cell to transmit DL control information to the DL UE. The IM region may be used for performing the CLI measurement. The DL data region may be used for the DL cell to transmit DL data to the DL UE. The Tx/Rx transition gap may be reserved for the DL UE to perform DL to UL transition. The ULCC region may be used for the DL UE to transmit UL control information to the DL cell. Slot 302 may comprise a DLCC region, a Tx/Rx transition gap, a CLI-RS (e.g., SRS) region, an UL data region (e.g., physical uplink shared channel (PUSCH)) and an ULCC region. The DLCC may be used for the UL cell to transmit DL control information to the UL UE. The Tx/Rx transition gap may be reserved for the UL UE to perform DL to UL transition. The UL data region may be used for the UL UE to transmit UL data to the UL cell. The SRS region may be used for transmitting the SRS. The UL data region may be used for the UL UE to transmit UL data to the UL cell. The ULCC region may be used for the UL UE to transmit UL control information to the UL cell.

As showed in FIG. 3, the location of the SRS region may be in front of the slot. The UL UE may be configured to transmit the CLI RS (e.g., SRS) in the SRS region. The DL cell may be configured to measure the CLI RS (e.g., SRS) from the UL UE in the IM region. In a case that the DL cell does not immediately transmit the DL data after the DLCC region, the DL cell may be configured to wait and measure the CLI RS (e.g., SRS) from other node(s) (e.g., UL UE) in the IM region. After measuring the CLI RS, the DL cell may be able to determine whether the CLI may occur and whether to transmit the following DL data based on the CLI measurement results. In a case that the CLI may occur, the DL cell may determine not to transmit the DL data in the DL data region to avoid the possible CLI.

Figure 4:
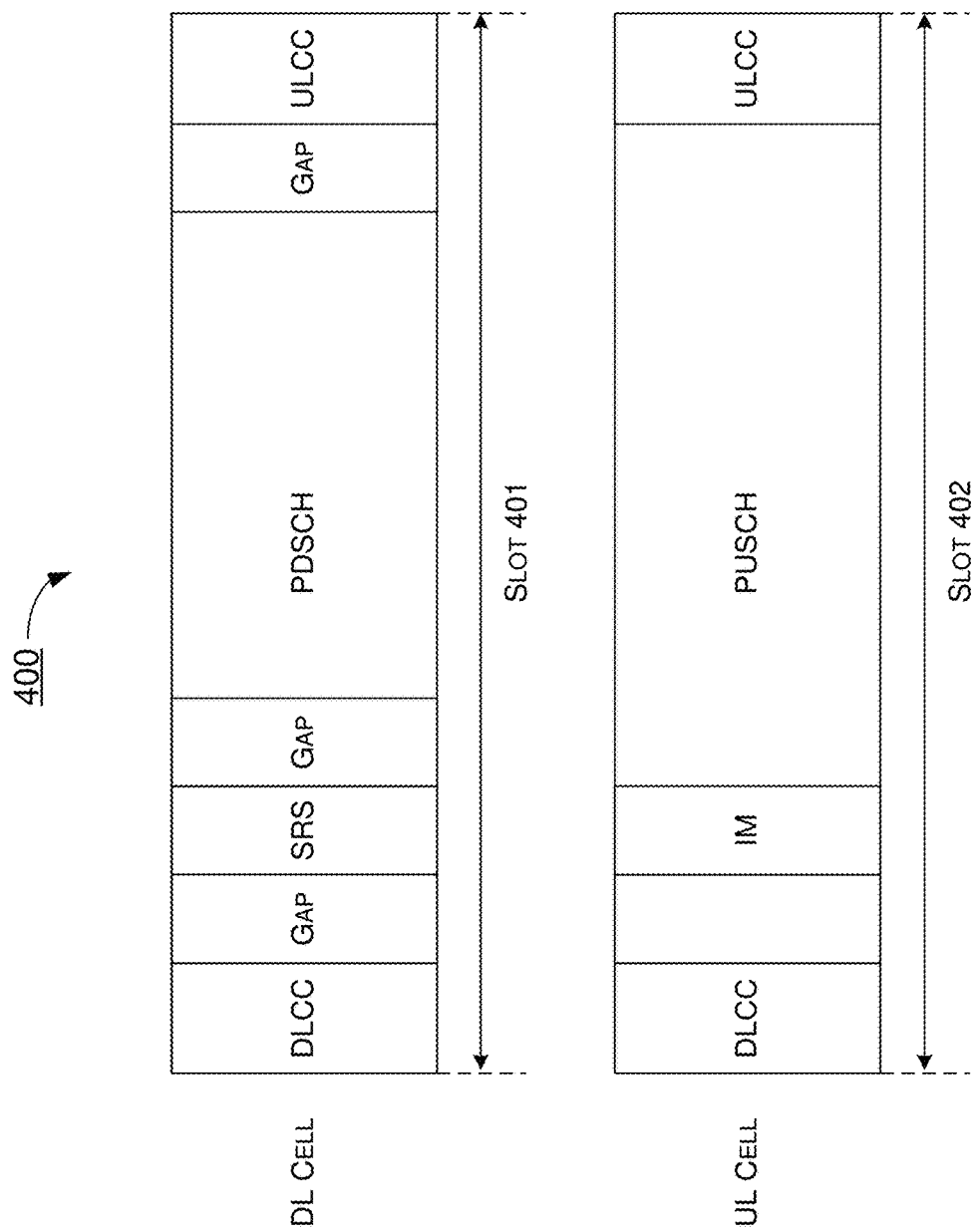
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a plurality of nodes including a DL cell, a DL UE, an UL cell and a UL UE, which may be a part of a wireless communication network (e.g., an LTE network, an LTE-Advanced network, an LTE-Advanced Pro network, a 5G network, an NR network or an IoT network). FIG. 4 illustrates slot 401 for a DL cell and slot 402 for an UL cell. Slot 401 may comprise a DLCC region, a Tx/Rx transition gap, a CLI-RS (e.g., SRS) region, a Tx/Rx transition gap, a DL data region (e.g., PDSCH), a Tx/Rx transition gap and a ULCC region. Slot 402 may comprise a DLCC region, an IM region, a Tx/Rx transition gap, an UL data region (e.g., PUSCH), a Tx/Rx transition gap and an ULCC region.

As showed in FIG. 4, the location of the SRS region may be in front of the slot. The DL UE may be configured to transmit the CLI RS (e.g., SRS) in the SRS region. The UL UE may be configured to measure the CLI RS (e.g., SRS) from the DL UE in the IM region. In a case that the UL UE does not immediately transmit the UL data after the DLCC region, the UL UE may be configured to wait and measure the CLI RS (e.g., SRS) from other node(s) (e.g., DL UE) in the IM region. After measuring the CLI RS, the UL UE may be able to determine whether the CLI may occur and whether to transmit the following UL data based on the CLI measurement results. In a case that the CLI may occur, the UL UE may determine not to transmit the UL data in the UL data region to avoid the possible CLI.

In some implementation, the location of the CLI-RS (e.g., SRS) region may be configured in back of a slot. A node (e.g., UE) may be configured to transmit the SRS after the data region (e.g., PUSCH). The other node may be configured to measure the transmitted SRS in a corresponding IM region in back of a slot. In some implementation, the location of the CLI-RS (e.g., SRS) region may also be configured in middle of a slot. Accordingly, the location of the CLI-RS region may be flexible and depend on practical requirements.

In some implementation, TRP-TRP interference measurements may be performed to identify the CLI victim and to have transmission direction coordination for the nodes which cause or suffer severe CLI. Specifically, the TRP may exchange the information with each other and have consensus on the measurement slot occurrences. The TRP may also exchange the information about the CSI-RS resources, the transmission beam and the reception beam. The TRP may determine whether to transmit or measure the CSI-RS in the measurement slot. The TRP that determine to transmit the CSI-RS may choose one of the transmission beams. The TRP that determine to measure the CSI-RS may choose one of the reception beams to receive the CSI-RS. After measuring the CSI-RS, the TRP may be configured to change its scheduling strategy including the beam direction based on the measurement result. The TRP may further forward the measurement result to the neighboring TRPs. The neighboring TRPs may then know which beam pair may have strong CLI.

Illustrative Implementations

Figure 5:
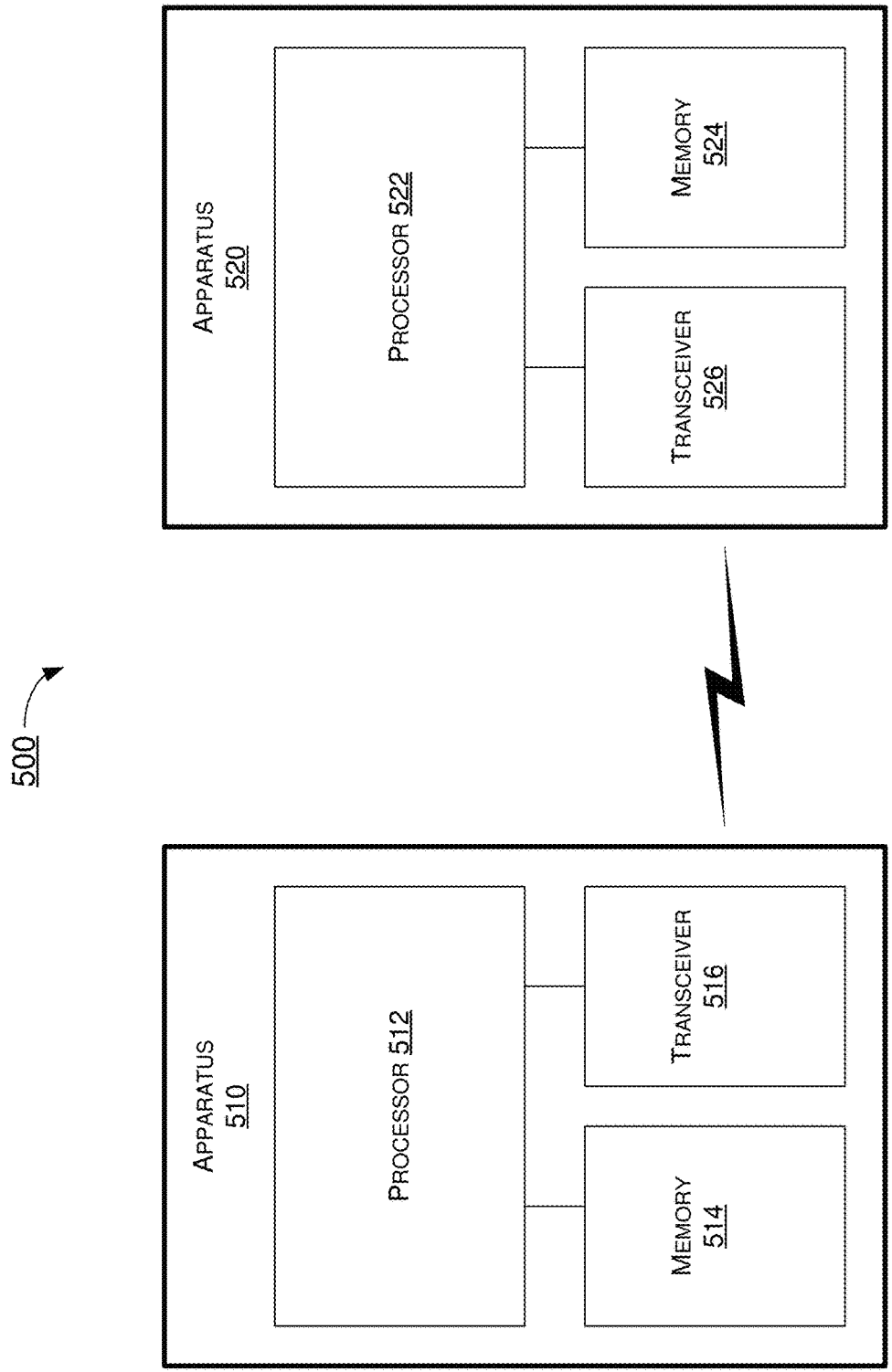
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to cross-link interference measurements with respect to user equipment and network apparatus in wireless communications, including scenarios 100, 200, 300 and 400 described above as well as process 600 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT or NB-IoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, or one or more complex-instruction-set-computing (CISC) processors. Communication apparatus 510 may include at least some of those components shown in FIG. 5 such as a processor 512, for example. communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a TRP, a base station, a small cell, a router or a gateway. For instance, network apparatus 520 may be implemented in an eNodeB in an LTE, LTE-Advanced or LTE-Advanced Pro network or in a gNB in a 5G, NR, IoT or NB-IoT network. Alternatively, network apparatus 520 may be implemented in the form of one or more IC chips such as, for example and without limitation, one or more single-core processors, one or more multi-core processors, or one or more CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, processor 512 may be configured to receive, via transceiver 516, a CLI measurement configuration. The CLI measurement configuration may comprise at least one of a node identity (ID), a time-frequency location, a slot number or a symbol number of the CLI RS. Processor 512 may be configured to determine a measurement slot according to the CLI measurement configuration. The CLI measurement configuration may indicate periodic measurement slots.

In some implementations, after receiving the CLI measurement configuration, processor 512 may be able to determine whether to perform the CLI measurement according to the CLI measurement configuration. In a case that the CLI measurement configuration indicates communication apparatus 510 to measure the CLI RS, processor 512 may be configured to receive, via transceiver 516, the CLI RS in the measurement slots. Processor 512 may be further configured to perform the CLI measurement in the measurement slots.

In some implementations, after receiving the CLI measurement configuration, processor 512 may be able to determine whether to transmit the CLI RS according to the CLI measurement configuration. In a case that the CLI measurement configuration indicates communication apparatus 510 to transmit the CLI RS, processor 512 may be configured to transmit the CLI RS in the measurement slots.

In some implementation, processor 512 may be configured to determine whether to transmit the CLI RS based on a probability p. Processor 512 may determine whether to transmit the CLI RS according to a traffic buffer status. Processor 522 may estimate the required downlink to uplink slot ratio based on the traffic buffer status and the estimated throughput of different transmission directions. Processor 522 may assign a probability p that equals to the required uplink slot ratio. P may be the probability to transmit the CLI RS on the CLI measurement slots. Processor 512 may transmit the CLI RS according to the probability p.

In some implementation, processor 512 may use a demodulation reference signal (DMRS) to measure the CLI. The downlink DMRS and the uplink DMRS may be configured to have different sequences/designs and/or different frequency-time patterns. Processor 512 or processor 522 may measure the interference strength from different transmission directions based on the different sequences/designs and/or different frequency-time patterns.

In some implementation, when processor 512 receives the CSI-RS, processor 512 may also have the ability to measure the SRS from other nodes. The reported CSI may then automatically take CLI into consideration. On the other hand, when processor 522 receives the SRS, the CSI-RS from other nodes may also be measured by processor 522.

In some implementation, processor 522 may exchange the information with other TPRs and have consensus on the measurement slots occurrences. Processor 522 may also exchange the information with other TPRs about the SRS resources it used. Processor 522 may determine whether to transmit or measure the SRS in the measurement slots and inform communication apparatus 510. In a case that processor 522 determine to instruct communication apparatus 510 to transmit the SRS in the measurement slots, it may trigger communication apparatus 510 to transmit the SRS according to radio resource control (RRC) configured SRS resources or dynamically downlink control information (DCI) indicated SRS resources. In a case that processor 522 determine to instruct communication apparatus 510 to measure the SRS in the measurement slots, it may inform communication apparatus 510 about the information of the SRS from other nodes. After measuring the CLI, processor 512 may be configured to feedback the measurement report to network apparatus 520. Processor 522 may change its scheduling strategy based on the measurement report. Processor 522 may also forward the measurement report to the neighboring TRPs to achieve better system performance.

In some implementation, in a case that the SRS is not resource specified, processor 512 may be configured to receive, via transceiver 516, the SRS resources from network apparatus 520. The SRS resources may comprise at least one of a root sequence, a cyclic shift, a comb number or a frequency location of the SRS transmitted from other nodes (e.g., other UEs under TRPs). This also implies that processor 522 may exchange the SRS resources information with other nodes. Processor 512 may be configured to determine the SRS sequences according to the SRS resources. Processor 512 may be configured to measure the reference symbol received power (RSRP) of each SRS. Processor 512 may further be configured to report the SRS sequences and the RSRPs to network apparatus 520.

In some implementation, in a case that the SRS is resource specified, processor 512 may be configured to blindly detect the possible SRS according to the pre-determined SRS resources without additional information from network apparatus 520. The pre-determined SRS resources may comprise at least one of a root sequence, a cyclic shift, a comb number or a frequency location of the SRS transmitted from other nodes (e.g., other UEs under TRPs). Processor 512 may determine the SRS sequences according to the pre-determined SRS resources. Processor 512 may be configured to measure the RSRP of the possible SRS. Processor 512 may further be configured to report the SRS sequences and the RSRPs to network apparatus 520.

In some implementation, processor 512 may include the SRS sequences and the corresponding RSRPs in the measurement report. The reported RSRPs may exceed a pre-determined threshold value. Processor 512 may include the strongest nth SRS sequences and the corresponding RSRPs in the measurement report. Processor 522 may forward the measurement report to the neighboring TRPs via backhaul or over the air (OTA) signaling.

In some implementations, processor 512 may not need to identify the SRS sources or perform any blind detections. Processor 512 may only report the received power on the given resources (e.g. REs occupied by SRSs). Processor 512 may be configured to measure the received power over SRS resource(s) (e.g. REs occupied by SRSs) which is reported with an accompanying identification of the SRS resource(s) and/or SRS sequence(s) to network apparatus 520. Processor 522 may only know whether communication apparatus 510 is severely interfered by other nodes or not (e.g., whether communication apparatus 510 is at the cell edge or not). Processor 522 may schedule the cell edge communication apparatus in the static slots where no CLI exists and schedule the cell center communication apparatus in the dynamic slots.

In some implementations, processor 512 may be configured to transmit the CLI RS (e.g., SRS) in an SRS region located in front of a slot. Processor 522 may be configured to measure the CLI RS (e.g., SRS) from communication apparatus 510 in an interference measurement (IM) region. In a case that processor 522 does not immediately transmit the DL data after the DLCC region, processor 522 may be configured to wait and measure the CLI RS (e.g., SRS) from communication apparatus 510 in the IM region. After measuring the CLI RS, processor 522 may be able to determine whether the CLI may occur and whether to transmit the following DL data based on the CLI measurement results. In a case that the CLI may occur, processor 522 may determine not to transmit the DL data in the DL data region to avoid the possible CLI.

In some implementations, processor 512 may be configured to measure the CLI RS (e.g., SRS) from other nodes in the IM region. In a case that processor 512 does not immediately transmit the UL data after the DLCC region, processor 512 may be configured to wait and measure the CLI RS (e.g., SRS) from other nodes in the IM region. After measuring the CLI RS, processor 512 may be able to determine whether the CLI may occur and whether to transmit the following UL data based on the CLI measurement results. In a case that the CLI may occur, processor 512 may determine not to transmit the UL data in the UL data region to avoid the possible CLI.

In some implementation, the location of the CLI-RS (e.g., SRS) region may be configured in back of a slot. Processor 512 may be configured to transmit the SRS after the data region (e.g., PUSCH). Processor 512 may also be configured to measure the transmitted SRS in a corresponding IM region in back of a slot.

In some implementation, the location of the CLI-RS (e.g., SRS) region may also be configured in middle of a slot. Processor 512 may be configured to transmit the SRS in middle of a slot. Processor 512 may also be configured to measure the transmitted SRS in a corresponding IM region in middle of a slot.

In some implementation, processor 522 may exchange the information and have consensus on the measurement slot occurrences. Processor 522 may also exchange the information about the CSI-RS resources, the transmission beam and the reception beam with other TRPs. Processor 522 may determine whether to transmit or measure the CSI-RS in the measurement slot. Processor 522 that determine to transmit the CSI-RS may choose one of the transmission beams. Processor 522 that determine to measure the CSI-RS may choose one of the reception beams to receive the CSI-RS. After measuring the CSI-RS, processor 522 may be configured to change its scheduling strategy including the beam direction based on the measurement result. Processor 522 may further forward the measurement result to the neighboring TRPs.

Illustrative Processes

Figure 6:
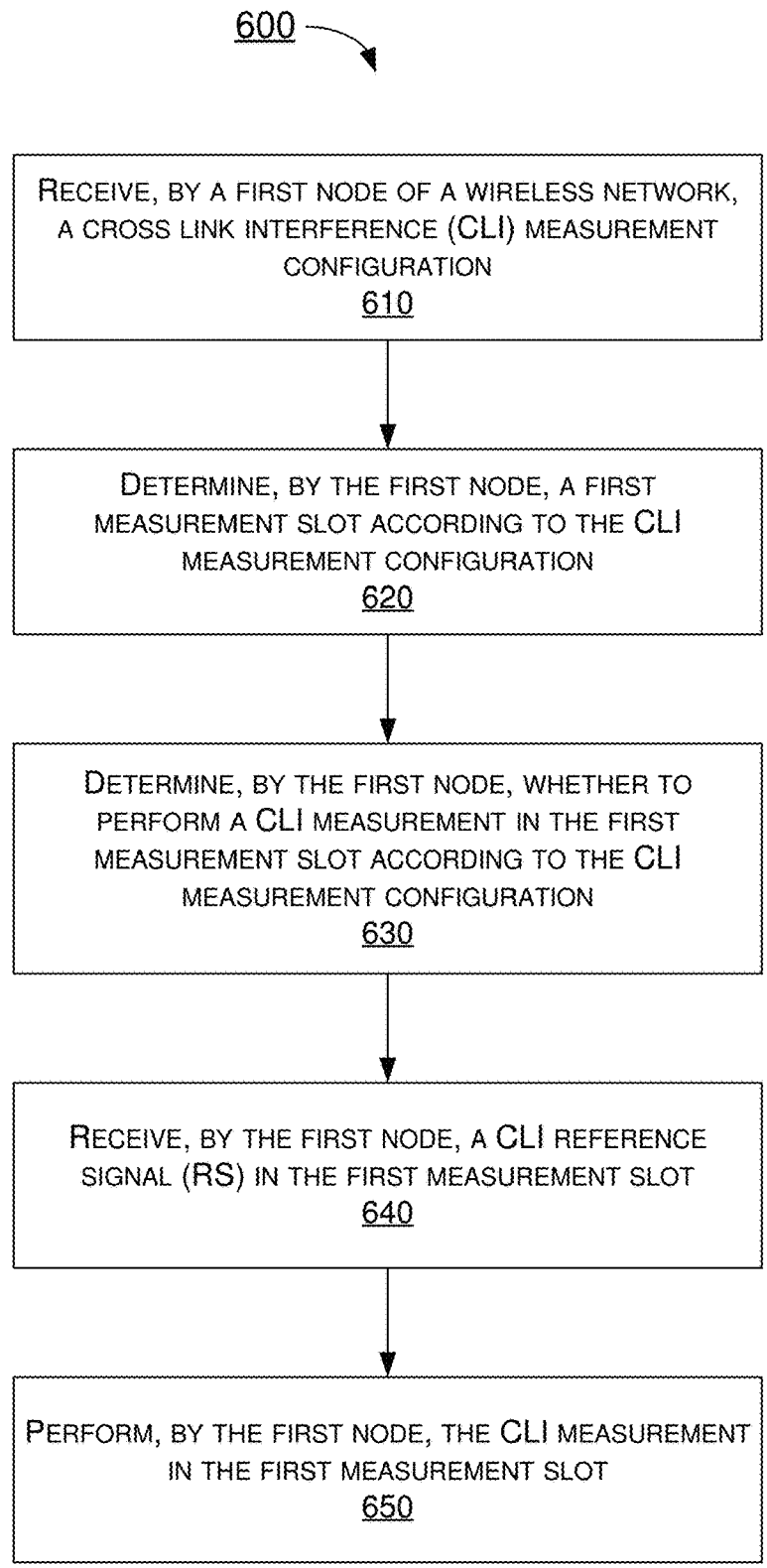
FIG. 6 is a flowchart of an example process in accordance with an implementation of the present disclosure.

FIG. 6 illustrates an example process 600 in accordance with an implementation of the present disclosure. Process 600 may be an example implementation of scenarios 100, 200, 300 and 400, whether partially or completely, with respect to sounding reference signal design in accordance with the present disclosure. Process 600 may represent an aspect of implementation of features of communication apparatus 510. Process 600 may include one or more operations, actions, or functions as illustrated by one or more of blocks 610, 620, 630, 640 and 650. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve apparatus 510, as a first node of a wireless network, receiving a cross-link interference (CLI) measurement configuration. Process 600 may proceed from 610 to 620.

At 620, process 600 may involve apparatus 510 determining a first measurement slot according to the CLI measurement configuration. Process 600 may proceed from 620 to 630.

At 630, process 600 may involve apparatus 510 determining whether to perform a CLI measurement in the first measurement slot according to the CLI measurement configuration. Process 600 may proceed from 630 to 640.

At 640, process 600 may involve apparatus 510 receiving a CLI reference signal (RS) in the first measurement slot. Process 600 may proceed from 640 to 650.

At 650, process 600 may involve apparatus 510 performing the CLI measurement in the first measurement slot.

In some implementations, the CLI measurement configuration may indicates periodic measurement slots. The CLI measurement configuration may comprise at least one of a node identity (ID), a time-frequency location, a slot number or a symbol number of the CLI RS. The CLI RS may comprise at least one of a sounding reference signal (SRS), a channel state information-reference signal (CSI-RS) or a demodulation reference signal (DMRS).

In some implementations, process 600 may involve apparatus 510 determining a second measurement slot according to the CLI measurement configuration. Process 600 may also involve apparatus 510 determining whether to transmit the CLI RS in the second measurement slot according to the CLI measurement configuration. Process 600 may further involve apparatus 510 transmitting the CLI RS in the second measurement slot.

In some implementations, the CLI RS may comprise the SRS. Process 600 may involve apparatus 510 receiving an SRS resource of an SRS. Process 600 may also involve apparatus 510 determining an SRS sequence according to the SRS resource. Process 600 may further involve apparatus 510 measuring a reference symbol received power (RSRP) of the SRS. Process 600 may further involve apparatus 510 reporting the SRS sequence and the RSRP to a second node of the wireless network.

In some implementations, the CLI RS may comprise the SRS. Process 600 may involve apparatus 510 blindly detecting an SRS according to a pre-determined SRS resource. Process 600 may also involve apparatus 510 determining an SRS sequence according to the pre-determined SRS resource. Process 600 may further involve apparatus 510 measuring a reference symbol received power (RSRP) of the SRS. Process 600 may further involve apparatus 510 reporting the SRS sequence and the RSRP to a second node of the wireless network.

In some implementations, the SRS resource may comprise at least one of a root sequence, a cyclic shift, a comb number or a frequency location.

In some implementations, the CLI RS may comprise the SRS. Process 600 may involve apparatus 510 measuring a received power of an SRS. Process 600 may also involve apparatus 510 reporting the received power to a second node of the wireless network.

In some implementations, process 600 may involve apparatus 510 determining whether to transmit uplink data according to a CLI measurement result. The CLI RS may be received at front of the first measurement slot.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a first node of a wireless network, a cross-link interference (CLI) measurement configuration;
determining, by the first node, a first measurement slot according to the CLI measurement configuration;
determining, by the first node, whether to perform a CLI measurement or to transmit a first CLI reference signal (RS) in the first measurement slot according to an indication in the CLI measurement configuration; and
performing, by the first node responsive to the CLI measurement configuration indicating to the first node to perform the CLI measurement, operations comprising:
receiving a second CLI RS in the first measurement slot; and
performing the CLI measurement in the first measurement slot.

2. The method of claim 1, wherein the CLI measurement configuration indicates periodic measurement slots.

3. The method of claim 1, wherein the CLI measurement configuration comprises at least one of a node identity (ID), a time-frequency location, a slot number or a symbol number of at least one of the first CLI RS and the second CLI RS.

4. The method of claim 1, wherein at least one of the first CLI RS and the second CLI RS comprises at least one of a sounding reference signal (SRS), a channel state information-reference signal (CSI-RS) or a demodulation reference signal (DMRS).

5. The method of claim 1, further comprising:
determining, by the first node, a second measurement slot according to the CLI measurement configuration;
determining, by the first node, whether to transmit the first CLI RS in the second measurement slot according to the CLI measurement configuration; and
transmitting, by the first node, the first CLI RS in the second measurement slot.

6. The method of claim 1, further comprising:
receiving, by the first node, a sounding reference signal (SRS) resource of an SRS;
determining, by the first node, an SRS sequence according to the SRS resource;
measuring, by the first node, a reference symbol received power (RSRP) of the SRS; and
reporting, by the first node, the SRS sequence and the RSRP to a second node of the wireless network,
wherein the second CLI RS comprises the SRS.

7. The method of claim 1, further comprising:
blindly detecting, by the first node, a sounding reference signal (SRS) according to a pre-determined SRS resource;
determining, by the first node, an SRS sequence according to the pre-determined SRS resource;
measuring, by the first node, a reference symbol received power (RSRP) of the SRS; and
reporting, by the first node, the SRS sequence and the RSRP to a second node of the wireless network,
wherein the second CLI RS comprises the SRS.

8. The method of claim 6, wherein the SRS resource comprises at least one of a root sequence, a cyclic shift, a comb number or a frequency location.

9. The method of claim 1, further comprising:
measuring, by the first node, a received power of a sounding reference signal (SRS); and
reporting, by the first node, the received power to a second node of the wireless network,
wherein the second CLI RS comprises the SRS.

10. The method of claim 1, further comprising:
determining, by the first node, whether to transmit uplink data according to a CLI measurement result,
wherein the second CLI RS is received at front of the first measurement slot.

11. An apparatus, comprising:
a transceiver capable of wirelessly communicating with a plurality of nodes of a wireless network; and
a processor communicatively coupled to the transceiver, the processor capable of:
receiving, via the transceiver, a cross-link interference (CLI) measurement configuration;
determining a first measurement slot according to the CLI measurement configuration;
determining whether to perform a CLI measurement or to transmit a first CLI reference signal (RS) in the first measurement slot according to an indication in the CLI measurement configuration; and
performing, responsive to the CLI measurement configuration indicating to the first node to perform the CLI measurement, operations comprising:
receiving, via the transceiver, a second CLI RS in the first measurement slot; and
performing the CLI measurement in the first measurement slot.

12. The apparatus of claim 11, wherein the CLI measurement configuration indicates periodic measurement slots.

13. The apparatus of claim 11, wherein the CLI measurement configuration comprises at least one of a node identity (ID), a time-frequency location, a slot number or a symbol number of at least one of the first CLI RS and the second CLI RS.

14. The apparatus of claim 11, wherein at least one of the first CLI RI and the second CLI RS comprises at least one of a sounding reference signal (SRS), a channel state information-reference signal (CSI-RS) or a demodulation reference signal (DMRS).

15. The apparatus of claim 11, wherein the processor is further capable of:
determining a second measurement slot according to the CLI measurement configuration;
determining whether to transmit the first CLI RS in the second measurement slot according to the CLI measurement configuration; and
transmitting, via the transceiver, the first CLI RS in the second measurement slot.

16. The apparatus of claim 11, wherein the processor is further capable of:
receiving, via the transceiver, a sounding reference signal (SRS) resource of an SRS;
determining an SRS sequence according to the SRS resource;
measuring a reference symbol received power (RSRP) of the SRS; and
reporting, via the transceiver, the SRS sequence and the RSRP to a second node of the wireless network,
wherein the second CLI RS comprises the SRS.

17. The apparatus of claim 11, wherein the processor is further capable of:
  blindly detecting a sounding reference signal (SRS) according to a pre-determined SRS resource;
  determining an SRS sequence according to the pre-determined SRS resource;
  measuring a reference symbol received power (RSRP) of the SRS; and
  reporting, via the transceiver, the SRS sequence and the RSRP to a second node of the wireless network,
  wherein the second CLI RS comprises the SRS.

18. The apparatus of claim 16, wherein the SRS resource comprises at least one of a root sequence, a cyclic shift, a comb number or a frequency location.

19. The apparatus of claim 11, wherein the processor is further capable of:
  measuring a received power of a sounding reference signal (SRS); and
  reporting, via the transceiver, the received power to a second node of the wireless network,
  wherein the second CLI RS comprises the SRS.

20. The apparatus of claim 11, wherein the processor is further capable of:
  determining whether to transmit uplink data according to a CLI measurement result,
  wherein the second CLI RS is received at front of the first measurement slot.

\* \* \* \* \*